(12) United States Patent
Kikuyama et al.

(10) Patent No.: US 7,214,362 B2
(45) Date of Patent: May 8, 2007

(54) PURIFICATION METHOD FOR PRODUCING HIGH PURITY NIOBIUM COMPOUND AND/OR TANTALUM COMPOUND

(75) Inventors: Hirohisa Kikuyama, Izumiootsu (JP); Masahide Waki, Izumiootsu (JP); Hiroto Izumi, Izumiootsu (JP); Hirofumi Yazaki, Izumiootsu (JP); Kenji Aoki, Izumiootsu (JP); Shinji Hashiguchi, Izumiootsu (JP); Masatsugu Kawawaki, Izumiootsu (JP); Yuko Murakami, Izumiootsu (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 121 days.

(21) Appl. No.: 10/505,803

(22) PCT Filed: Feb. 27, 2003

(86) PCT No.: PCT/JP03/02225

§ 371 (c)(1),
(2), (4) Date: Oct. 7, 2004

(87) PCT Pub. No.: WO03/072504

PCT Pub. Date: Sep. 4, 2003

(65) Prior Publication Data

US 2005/0115364 A1 Jun. 2, 2005

(30) Foreign Application Priority Data

Feb. 27, 2002 (JP) .............................. 2002-052412

(51) Int. Cl.
*C01G 35/00* (2006.01)
*C01G 33/00* (2006.01)
(52) U.S. Cl. .................. 423/594.17; 423/472; 423/464; 423/594.8; 423/64; 423/65; 423/68

(58) Field of Classification Search ................ 423/464, 423/489, 64, 65, 67, 68, 63, 594.17, 472, 423/462, 594.8, 594.15
See application file for complete search history.

(56) References Cited

U.S. PATENT DOCUMENTS

| | | | |
|---|---|---|---|
| 2,962,327 A | | 11/1960 | Benevall |
| 3,072,459 A | * | 1/1963 | Foos et al. .................... 423/64 |
| 4,164,417 A | * | 8/1979 | Gustison ..................... 420/425 |
| 5,194,232 A | * | 3/1993 | Bludssus et al. .............. 423/65 |
| 5,209,910 A | * | 5/1993 | Bludssus et al. .............. 423/63 |
| 5,385,713 A | * | 1/1995 | Carlson ........................ 423/11 |
| 6,592,830 B1 | * | 7/2003 | Krupin et al. ................. 423/66 |
| 6,764,669 B2 | * | 7/2004 | Isaka et al. .................. 423/464 |
| 6,800,268 B2 | * | 10/2004 | Uchino et al. ............... 423/464 |
| 2005/0013765 A1 | * | 1/2005 | Thomas et al. .......... 423/592.1 |

FOREIGN PATENT DOCUMENTS

| | | |
|---|---|---|
| JP | 49-032897 | 3/1974 |
| JP | 58-176128 | 10/1983 |
| JP | 62-158118 | 7/1987 |
| JP | 64-31937 | 2/1989 |
| JP | 4-021524 | 1/1992 |
| JP | 2000-327330 | 11/2000 |
| JP | 2001-146424 | 5/2001 |

* cited by examiner

*Primary Examiner*—Ngoc-Yen Nguyen
(74) *Attorney, Agent, or Firm*—Jordan and Hamburg LLP

(57) ABSTRACT

An object of the present invention is to provide a method for purifying a highly pure niobium compound and/or tantalum compound, the method enabling the purification of a highly pure niobium compound and tantalum compound in a simplified manner at a low cost. The object is met by providing a method comprising adding an organic solvent to an aqueous solution containing a niobium compound and/or tantalum compound together with impurities, and then performing extraction via the solution. A niobium compound and/or tantalum compound dissolved in a solution is allowed to precipitate, and said aqueous solution is obtained by dissolving the precipitate in water.

16 Claims, No Drawings

PURIFICATION METHOD FOR PRODUCING HIGH PURITY NIOBIUM COMPOUND AND/OR TANTALUM COMPOUND

TECHNICAL FIELD

The present invention relates to a method for obtaining a highly pure niobium compound and/or tantalum compound.

BACKGROUND ART

Niobium has been used as an additive to steel because niobium is effective in stabilizing carbon in steel and prevents the progression of corrosion among particles. A niobium alloy has been used as a material of a conductive tube attached to the light emitting portion of a high-pressure sodium lamp, a superconductive material and an additive to a super alloy. Recently, demand for niobium oxide is notable because niobium has been widely used in electronic and optical fields. Particularly in those fields, highly pure niobium is indispensable. Purification of niobium compounds has been achieved by various methods depending on the niobium compounds serving as starting materials. For example, the purification of niobium oxide has been achieved by differential crystallization, solvent extraction, ion-exchange resin-based separation, distillation, etc. However, ores used for the extraction of niobium such as columbite or niocalite contain tantalum together with niobium. Moreover, since niobium shares many physical and chemical properties with tantalum, it has been extremely difficult to separate niobium from tantalum. Accordingly, many methods proposed heretofore include extracting metallurgical products containing the two elements from the ores.

For example, the ore containing both niobium and tantalum is ground to a powder which is treated with an acid mixture comprising hydrofluoric acid and mineral acid, e.g., sulfuric acid, so that niobium and tantalum are dissolved in the acid mixture together with other metal impurities such as iron, manganese, calcium, rare earth elements, etc. The solution is allowed to contact with an organic solvent such as ketone, ester or ether of a lower fatty acid, particularly methyl-isobutyl-ketone, and niobium and tantalum are extracted through the organic phase. According to a second method disclosed in A published Japanese Patent Application, Publication No. S58(1983)-176128, the solution described above is allowed to pass over an F-type anion-exchange resin layer to allow niobium and tantalum to be adsorbed to the resin layer, thereby separating the two elements from other metal impurities. Then, the two elements are dissolved in aqueous solutions of hydrofluoric acid and ammonium chloride to be recovered later.

Various processes for separating niobium from tantalum have been investigated. One such conventional process consists of separating the two elements dissolved in an aqueous solution based on the difference in their concentrations of salting-out and hydrogen ions. Specifically, when the concentrations of hydrofluoric acid and mineral acid constituting an acid mixture dissolving niobium and tantalum compounds are reduced, $NbF_7^{2-}$ is converted into $NbOF_5^{2-}$ while $TaF_7^{2-}$ stays unchanged, and thus it is possible to selectively extract tantalum using an organic solvent such as methyl-isobutyl-ketone. Alternatively, it is also possible by a process contrary to the above to extract tantalum and niobium using an organic solvent and then to selectively extract niobium using an acidic aqueous solution. However, as discussed in A published Japanese Patent Application, Publication No. S62(1987)-158118, the process for obtaining a highly pure niobium or tantalum using a ketone such as methyl-isobutylketone (MIBK) becomes a publicly known technique. Yet another method is disclosed in A published Japanese Patent Application Publication No. S64(1989)-31937. The method includes the use of a porous support made of active carbon or polypropylene to which an oxygen-containing organic solvent such as trioctyiphosphine oxide or an organic solvent chosen from alkylamines in which the alkyl group has four or more carbon atoms is attached or linked, and comprises the step of flowing an acidic aqueous solution containing the two elements over the support so that only tantalum is adsorbed to the support and separated from the acidic solution. However, it is difficult to obtain a support to which an organic solvent is linked. Alternatively, if the organic solvent is impregnated into a porous support, dissolution of the organic solvent to the water phase poses a problem. However, the above extraction method greatly complicates the process, for example, it requires multiple extraction steps: the water phase must be washed with an organic solvent in a series of mixing-settling steps.

In view of these problems inherent to the conventional methods, an object of the present invention is to provide a method for purifying a highly pure niobium compound and/or tantalum compound in a more simplified manner at a lower cost than is possible with the conventional methods.

DISCLOSURE OF THE INVENTION

The method of the present invention achieves the high purification of a niobium compound dissolved in a solution by employing precipitation and extraction steps.

In the following, a system comprising niobium oxide dissolved in an aqueous solution of hydrofluoric acid is taken as an illustrative example. However, the precipitation step is not limited to the system based on a solution dissolving hydrofluoric acid, but can be applied similarly effectively to other systems based on aqueous solutions or organic solvents. Needless to say, the system may comprise one chosen from various niobates, and it is also possible with this system to obtain a targeted highly pure niobium compound.

Specifically, niobium oxide is dissolved in a hydrofluoric acid solution, and the solution is cooled to precipitate fluoro niobic acid ($H_2NbF_7$) or oxyfluoro niobic acid ($H_2NbOF_5$), thereby achieving the efficientseparation of the niobium compound from metal impurities such as Fe, Ni, Ti, etc. After this precipitation step, impurities are left in the solution, and the resulting crystal comprises pure fluoro niobic acid or oxyfluoro niobic acid. Needless to say, in the dissolution and precipitation steps, a solution system containing hydrofluoric acid to which sulfuric acid, nitric acid or hydrochloric acid is added may be used. After the dissolution of the acid, the system may be diluted with water so that the HF concentration can be adjusted as appropriate. Precipitation does not necessarily occur as a result of cooling, but may occur as a result of concentration.

The introduction of an extraction step enables the efficient removal of tantalum or a kin element belonging to the same element family that contaminates the system. The niobium source is not limited to an aqueous solution containing a niobium compound but may include a liquid melt of a crystal of fluoro niobic acid or oxyfluoniobic acid obtained by crystallization, or crystal of fluotantalic acid. The niobium compound may be purified by using, as an extraction solvent, a ketone such as MIBK (methyl-isobutyl-ketone), ester or ether, an organic phosphorus compound, or an amine. The use of a niobium compound as described above can obviate the need for counter extraction, and enables the selective removal of tantalum or a kin element after a single step. Generally, extraction occurs in a liquid-to-liquid extraction system where the weight ratio of the organic phase/water phase is 1 or more. However, it is found that the method of the invention makes it possible to achieve extraction in a liquid-to-liquid system where the weight ratio in question is below 1.

The extraction step may occur by using an aqueous solution of a niobium compound, or a liquid melt of a crystal of fluoro niobic acid or oxyfluoniobic acid obtained by crystallization, or crystal of fluotantalic acid without needing the addition of sulfuric acid for the adjustment of the acidity of the solution.

It is possible to obtain a highly pure niobium compound by treating as appropriate a niobium compound obtained as above as a starting material. For example, a solution containing a niobium compound is subjected, after extraction by precipitation, to alkali treatment to produce niobium hydroxide which is then fired to produce highly pure niobium oxide. It is also possible to obtain potassium fluoroniobate ($K_2NbF_7$) by allowing niobium hydroxide to react with potassium fluoride or potassium carbonate. It is further possible to obtain highly pure niobium metal by subjecting the highly pure niobium compound to alkali melting.

It is possible by using such a highly pure niobium compound obtained by the above method as a starting material to isolate highly pure niobium metal which can be used as a highly functional material in various fields including electronics and optics.

BEST MODE FOR CARRYING OUT THE INVENTION

Suitable niobium compounds to be purified by the method of the invention include niobium-containing ores or niobium compounds sold in the market for industrial use. A niobium compound containing niobium at about 99% is preferably used as a starting material, because then it is possible to easily obtain a highly pure niobium compound with a purity of 99.99% (4N) or higher at a sufficiently low cost as to make the industrialization of this niobium-purification process advantageous.

The present invention provides a method enabling the high purification of a niobium compound, the method comprising using a solution containing a niobium compound, and applying precipitation and extraction steps to the solution.

Niobium oxide is used as a starting niobium compound. In one such case, niobium oxide is dissolved in a hydrofluoric acid solution. In this case, the resulting aqueous solution of niobium exists as hydrogen fluoroniobate or oxyfluoroniobate. Allowing the niobium compound in the solution to precipitate makes it possible to separate the niobium compound from the solution. The precipitation step enables niobium to be completely separated from other metal impurities such as Fe, Ni, Ti, etc., as well as tantalum or a kin belonging to the same element family. As a result of the precipitation step, impurities are transferred to the liquid phase while the precipitate is recovered to be purified, which enables the simplified purification of the niobium compound.

Introduction of an extraction step subsequent to the precipitation step makes it possible to obtain a highly pure niobium compound which has a purity of 4N (99.99%) or higher in terms of the weight of niobium oxide. With regard to the extraction step, solvent extraction methods have been vigorously studied since about 1950, and became publicly known as techniques for producing highly pure niobium and tantalum compounds. Among others, Foos et al. studied solvent-extraction using ten and more organic solvents (see Foos, R. A. and Wilhelm, H. A., U.S.A.E.C. Report ISC-694(1954)). They found that ketones exhibit particularly satisfactory results. The inventive method uses, as well, a ketone as an extraction solvent according to the publicly known technique, but, needless to say, suitable solvents may include esters, ethers, organic phosphorus compounds, amines, etc.

According to the method of the invention, the extraction step occurs in a liquid-to-liquid extraction system where the phase ratio (organic phase/water phase) is below 1, which makes it possible to reduce the necessary volume of the organic solvent and the cost. Generally, the extraction step requires the addition of sulfuric acid for the adjustment of the pH of the system. However, according to the inventive method, the extraction does not need the addition of sulfuric acid, and thus makes it possible to reduce the required amount of alkali which is usually added later to neutralize the system. Specifically, the extraction step allows tantalum to be extracted through the organic phase, and thus a more highly purified niobium compound is left dissolved in the water phase. Needless to say, it is possible to obtain a highly pure niobium compound by repeating the above-described extraction step. According to the inventive method, however, it is possible to reduce the contamination of tantalum or a kin belonging to the same element family to a level of <0.5 ppm after a single cycle of the extraction step.

It is possible to obtain a highly pure niobium oxide by subjecting the aqueous solution of the niobium compound obtained as described above to alkali treatment, thereby producing insoluble niobium hydroxide, and to fire the niobium hydroxide. Needless to say, fluoro niobic acid or oxyfluoro niobic acid, that is, a water-soluble crystal obtained via the precipitation step may be treated, instead of as a starting material for the production of highly pure niobium oxide, as an intermediate in the production of highly pure niobium compounds such as highly pure niobium-containing salts, e.g., lithium oxyniobate (LiNbO$_3$), potassium fluoroniobate (K$_2$NbF$_7$), etc., or highly puremetal niobium (Nb), etc.

Needless to say, it is also possible to purify tantalum by the same method as the one used for the purification of niobium. For example, it is possible to obtain highly pure tantalum compounds such as tantalum oxide (Ta$_2$O$_5$), lithium oxytantalate (LiTaO$_3$), potassium fluorotantalate (K$_2$TaF$_7$), tantalum metal (Ta), or other tantalum-containing salts by the same method.

EXAMPLES

The present invention will be further illustrated by means of Examples in which a niobium compound is dissolved in hydrofluoric acid. However, the present invention is not limited to those examples.

Example 1

To a transparent PFA-made 1 L-volume vessel equipped with a stirrer, was transferred 500 g of 75% HF, to which was added, with stirring for about three hours, 150 g of niobium oxide containing metal impurities. The resulting mixture was further stirred at room temperature. Then, the insoluble residue was filtered out, and a solution of niobium in hydrofluoric acid containing niobium at about 300 g/L was obtained.

The solution of niobium in hydrofluoric acid was kept with stirring at −20° C. for two hours, to allow a niobium compound to precipitate. The precipitate was recovered by filtration.

All the extractions performed in Example 1 were applied to the precipitate recovered by filtration. The concentrations of individual impurities contained in the precipitate were as shown in Table 1.

The extraction consisted of transferring 40 g of the niobium compound obtained as the precipitate in a 1 L volume reflux extractor and adding thereto 360 g of distilled water or 1N aqueous solution of sulfuric acid.

Next, an organic solvent was added to the system. The organic solvents used included methyl-isobutyl-ketone (MIBK hereinafter) and cyclohexanone. In addition, the added amount of cyclohexanone was varied to alter the weight ratio of the organic phase/water phase (o/w ratio hereinafter). Specifically, the added amount of cyclohexanone was made 640 g (o/w ratio=1.6), 160 g (o/w ratio=0.4) or 80 g (o/w ratio=0.2). Then, the system was stirred for 10 minutes and left motionless. The lower water phase was separated from the upper MIBK or cyclohexanone layer, and 405 g of the extraction water layer was obtained.

To 40 g of a niobium crystal obtained by the precipitation step was added 360 g of 1N aqueous solution of sulfuric acid, which was followed by the addition of 80 g of trioctylphosphine oxide in the form of a crystal. The mixture was heated to 65° C. to dissolve the trioctylphosphine oxide crystal. The trioctylphosphine oxide layer was separated for removal, and the extracting water layer weighing 398 g was obtained.

An extraction experiment solely dependent on a liquid melt of the crystal obtained as the precipitate was performed as a comparison to the above solvent extractions. This extraction was based on the fact that the crystal has a melting point of 19° C. First, 40 g of the niobium crystal obtained as the precipitate was heated to 30° C. to be melted.

Then, to the melt was added 32 g of cyclohexanone, the mixture was stirred for 10 minutes, and left motionless. The lower liquid melt layer was separated from the upper cyclohexanone layer, and 42 g of the Nb extracting liquid melt was obtained.

To the extracting water layer or liquid melt was added 65 g of a 28% aqueous solution of ammonia to allow the niobium compound now turning into niobium hydroxide to precipitate. The precipitate comprising niobium hydroxide was recovered by filtration being separated from ammonium fluoride and other impurities.

The niobium hydroxide was fired at 1000° C. in an electric furnace to provide 13.9 g of niobium oxide. The obtained niobium oxide product was analyzed by inductively coupled plasma-atomic emission spectroscopy (ICP-AES), and the impurities it contained were found to be as shown in Table 1.

Table 1 shows that the profile of impurities are the same regardless of whether sulfuric acid was added to the system for adjusting the acidity of the system, or distilled water was added instead of sulfuric acid. Generally, extraction is performed with the o/w ratio being set at 1 or more. However, with the present system, even if the o/w ratio was made below 1, the content of impurities could be reduced to the same level as is achieved by the general extraction. Thus, according to the inventive method, it is not always necessary to add sulfuric acid to the system for the adjustment of its pH. This will help to reduce the amount of an alkali which would be required for neutralizing the system after the acidification of the system, and thus to reduce the cost.

Comparative Example 1

As Comparative Example, the extraction step accompanying no precipitation was performed on an HF solution containing niobium oxide, its impurity removing efficiency was studied, and the result was compared with Examples in which both the precipitation and extraction steps were performed. Dependency of the impurity removal on the number of extraction steps actually performed was also studied.

To a transparent PFA-made 1 L-volume vessel equipped with a stirrer, was transferred 500 g of 50% HF, to which was added with stirring over about three hours, 150 g of niobium oxide. The resulting mixture was further stirred while being heated to 70° C. and circulated. Then, the insoluble residue which was small in amount was filtered out, and a solution of niobium in hydrofluoric acid containing niobium at about 300 g/L was obtained. The concentrations of impurities contained in the solution used for extraction are shown in Table 2.

To a 1 L volume reflux extractor were transferred 150 g of a niobium-containing hydrofluoric acid solution prepared as above, and a 1N aqueous solution of sulfuric acid, to which was added cyclohexane to make the o/w ratio=0.4 to perform extraction. The system was stirred for 10 minutes, and left motionless. The lower water phase was separated from the upper cyclohexanone layer, and an aqueous solution containing Nb was obtained as a result of extraction.

In a similar manner, to a 1 L volume reflux extractor was transferred 150 g of a hydrofluoric acid solution containing niobium prepared as above which was followed by the addition of 120 g of a 6N sulfuric acid solution and then of 550 g of cyclohexanone. This allowed Nb and Ta to be extracted through the organic phase.

To the organic phase was added a 1N aqueous solution of sulfuric acid or distilled water to achieve re-extraction at the o/w ratio=0.4 or 1. The system was stirred for 10 minutes and left motionless. The lower water phase was separated from the upper cyclohexanone layer, and an aqueous solution containing Nb was obtained a result of extraction.

To the aqueous extraction solution was added a 28% aqueous solution of ammonia, and the niobium compound now turning into niobium hydroxide was allowed to precipitate. Ammonium fluoride and others were eliminated by filtration to provide niobium hydroxide.

The niobium hydroxide was fired at 1000° C. in an electric furnace to provide 25.7 g of niobium oxide. The obtained niobium oxide product was analyzed by ICP-AES, and the impurities it contained were found to be as shown in Table 2.

Inspection of the results shown in Table 2 reveals that reduction of impurities such as Ti, Fe, etc. was not satisfactory after a single cycle of extraction, and became notable only after re-extraction. Generally, removal of impurities is improved by repeating the extraction step, but removal of tantalum or a kin element could not reach a level Ta<0.5 ppm, no matter how many times the extraction step may be repeated.

Example 2

To a transparent PFA-made 1 L-volume vessel equipped with a stirrer, was transferred 500 g of 50% HF, to which was added 130 g of tantalum oxide containing metal impurities with stirring. The resulting mixture was further stirred for about five hours while being heated to 70° C. and circulated. Then, the insoluble residue was filtered out, and a solution of tantalum in hydrofluoric acid containing tantalum at about 300 g/L was obtained.

The solution of tantalum in hydrofluoric acid prepared as above was kept with stirring at −20° C. for two hours, to allow a tantalum compound to precipitate. The precipitate was recovered by filtration.

All the extractions performed in Example 2 were applied to the precipitate recovered by filtration. The concentrations of individual impurities contained in the precipitate were as shown in Table 3.

The extraction consisted of transferring 40 g of the tantalum compound obtained as the precipitate and 360 g of distilled water in a 1 L volume reflux extractor and adding thereto 80 g of cyclohexane (o/w ratio=0.2). Then, the system was stirred for 10 minutes and left motionless. The lower water phase was separated from the upper cyclohexanone layer, and 78 g of the cyclohexane layer was obtained.

To the cyclohexane layer was added 65 g of a 28% aqueous solution of ammonia to thereby allow tantalum to precipitate as tantalum hydroxide. The precipitate was recovered by filtration being separated from ammonium fluoride and other impurities, to provide tantalum hydroxide.

The tantalum hydroxide was fired at 1000° C. in an electric furnace to provide 12.1 g of tantalum oxide. The obtained tantalum oxide product was analyzed by ICP-AES, and the impurities it contained were found to be as shown in Table 3.

Inspection of the results shown in Table 3 indicates that extraction comprising a single dissolution step and precipitation step readily enables the production of highly pure tantalum with a purity of 99.99% or more as was observed in the purification of niobium.

As discussed above, the inventive method enables, by including precipitation as its first step, the highly efficient removal of all impurities, and thus can reduce not only load imposed on the extraction solvent, but also the amount of the solvent required for the purification process.

TABLE 1

| | EXAMPLE 1 | | | | | |
|---|---|---|---|---|---|---|
| o-layer | Crystals obtained via precipitation Crystals used for extraction | Trioctyl-phosphine oxide | MIBK | Cyclohexanone | | |
| w-layer composition | (Crystal precipitated) | 1N $H_2SO_4$ extraction | Distilled water extraction | Distilled water extraction | Liquid melt extraction | 1N $H_2SO_4$ extraction | 1N $H_2SO_4$ extraction |
| o/w | | 0.2 | 0.2 | 0.2 | 0.8 | 0.4 | 1.6 |
| Number of extractions | | 1 | 1 | 1 | 1 | 1 | 1 |
| Impurity content (ppm) | | | | | | | |
| Ta | 660 | <0.5 | <0.5 | <0.5 | <0.5 | <0.5 | <0.5 |
| Ti | 5 | 2 | 2 | 2 | 2 | 2 | 2 |
| Fe | 10 | 2 | 2 | 2 | 2 | 2 | 2 |
| Ni | 2 | <0.5 | <0.5 | <0.5 | <0.5 | <0.5 | <0.5 |
| Al | 1 | <0.5 | <0.5 | <0.5 | <0.5 | <0.5 | <0.5 |
| Sb | <0.5 | <0.5 | <0.5 | <0.5 | <0.5 | <0.5 | <0.5 |

The numerals represent weights relative to the weight of $Nb_2O_5$.

TABLE 2

COMPARATIVE EXAMPLE 1

| w-layer composition | o-layer Solution used for extraction | Cyclohexanone 1N $H_2SO_4$ extraction | 6N $H_2SO_4$ extraction -> 1N $H_2SO_4$ extraction | 6 N $H_2SO_4$ extraction -> 1N $H_2SO_4$ extraction | 6 N $H_2SO_4$ extraction -> distilled water extraction |
|---|---|---|---|---|---|
| o/w | | 0.4 | 2 -> 0.4 | 2 -> 1 | 2 -> 1 |
| Number of extractions | | Extraction 1 | Extraction -> re-extraction 2 | Extraction -> re-extraction 2 | Extraction -> re-extraction 2 |
| Impurity content (ppm) | | | | | |
| Ta | 1450 | 140 | 130 | 50 | 180 |
| Ti | 820 | 750 | 5 | 5 | 5 |
| Fe | 310 | 230 | 5 | 5 | 5 |
| Ni | 40 | 35 | <1 | <1 | <1 |
| Al | 30 | 15 | <1 | <1 | <1 |
| Sb | 15 | 5 | <1 | <1 | <1 |

The numerals represent weights relative to the weight of $Nb_2O_5$.

TABLE 3

EXAMPLE 2

| | Crystals obtained via precipitation | |
|---|---|---|
| o-layer | Crystal used for extraction (Crystal precipitated) | Cyclohexanone |
| w-layer composition | | Water extraction |
| o/w | | 0.2 |
| Number of extractions | | 1 |
| Impurity content (ppm) | | |
| Nb | 100 | <0.5 |
| Ti | 5 | 1 |
| Fe | 5 | 1 |
| Ni | <0.5 | <0.5 |
| Al | <0.5 | <0.5 |
| Sb | <0.5 | <0.5 |

The numerals represent weights relative to the weight of $Nb_2O_5$.

INDUSTRIAL APPLICABILITY

It is possible according to the inventive method to easily purify ores that contain niobium, or a commercially available niobium compound for industrial use preferably having a purity of about 99%, thereby producing a highly pure niobium compound containing niobium at 99.99% (4N) or higher. Thus, the method, even when enlarged to an industrial scale, will ensure the production of highly pure niobium compounds at a low cost.

Needless to say, niobium compound crystals or niobium compounds obtained after the crystallization step may be treated as an intermediate in the production of other niobium compounds containing niobium at a high purity. It is possible by using such a highly pure niobium compound obtained by the above method as a starting material to isolate highly pure niobium metal which can be used as a highly functional material in various high-quality fields including electronics and optics.

A feature of the inventive method consists in the simplified purification of a niobium compound. The inventive method is roughly based on three processes, i.e., (1) dissolving process, (2) precipitation process, and (3) extracting process (at least a single cycle of extraction). The inventive method is particularly characterized by the precipitation process which serves as a primary treatment for removing impurities and which will be simply executed even at an industrial scale. The extracting process of the inventive method requires only the small amount of an organic solvent, and may even dispense with the addition of sulfuric acid which would otherwise be required for the adjustment of the acidity of the system, and thus can reduce the use amount of alkali required for the neutralization of the system. Thus, the inventive method can reduce energy consumption required for the solvent-extraction step, but also load imposed on succeeding steps.

Needless to say, it is also possible to obtain a highly pure tantalum compound by using the same method as described above.

The invention claimed is:

1. A method for obtaining a highly pure niobium compound, comprising:
   dissolving a first niobium compound including tantalum as an impurity in an HF solution to form a second solution;
   precipitating crystals comprising a second niobium compound from the second solution to form precipitated crystals and a third solution;
   separating said precipitated crystals from said third solution;
   dissolving said precipitated crystals in an aqueous solution or melting said precipitated crystals to obtain a melt;
   adding an organic solvent to said melt or to said aqueous solution in which said precipitated crystals are dissolved;

conducting extraction with said organic solvent; and
recovering said highly pure niobium compound.

2. A method for obtaining a highly pure tantalum compound, comprising:
dissolving a first tantalum compound including niobium as an impurity in an HF solution to form a second solution;
precipitating crystals comprising a second tantalum compound from said second solution to form precipitated crystals and a third solution;
separating said precipitated crystals from said third solution;
dissolving said precipitated crystals in an aqueous solution or melting said precipitated crystals to obtain a melt;
adding an organic solvent to said melt or to said aqueous solution in which said precipitated crystals are dissolved;
conducting extraction with said organic solvent; and
recovering said highly pure tantalum compound.

3. The method according to claim 1, wherein said aqueous solution includes an acidic solution for adjusting the acidity of said aqueous solution.

4. The method according to claim 2, wherein said aqueous solution includes an acidic solution for adjusting the acidity of said aqueous solution.

5. The method according to claim 1, wherein no acidic solution for adjusting acidity is included in said aqueous solution.

6. The method according to claim 2, wherein no acidic solution for adjusting acidity is included in said aqueous solution.

7. The method according to claim 1, wherein the ratio of the organic phase/water phase during said extraction is below 1.

8. The method according to claim 2, wherein the ratio of the organic phase/water phase during said extraction is below 1.

9. The method according to claim 1, wherein the first niobium compound is niobium oxide.

10. The method according to claim 2, wherein the first tantalum compound is tantalum oxide.

11. The method according to claim 1, wherein said organic solvent comprises a ketone, an ester, an ether, an organic phosphor compound or an amine.

12. The method according to claim 2, wherein said organic solvent comprises a ketone, an ester, an ether, an organic phosphor compound or an amine.

13. The method according to claim 1, wherein said crystals comprising said second niobium compound comprise hydrogen fluoroniobate or oxyfluoroniobate.

14. The method according to claim 2, wherein said crystals comprising said tantalum compound comprise hydrogen fluorotantalate.

15. The method according to claim 1, wherein said extraction comprises extracting said tantalum impurity with said organic solvent from said aqueous solution or said melt.

16. The method according to claim 2, wherein said extraction comprises extracting tantalum with said organic solvent from said aqueous solution or said melt so as to leave said niobium impurity in said aqueous solution or said melt.

* * * * *